Figure 1:
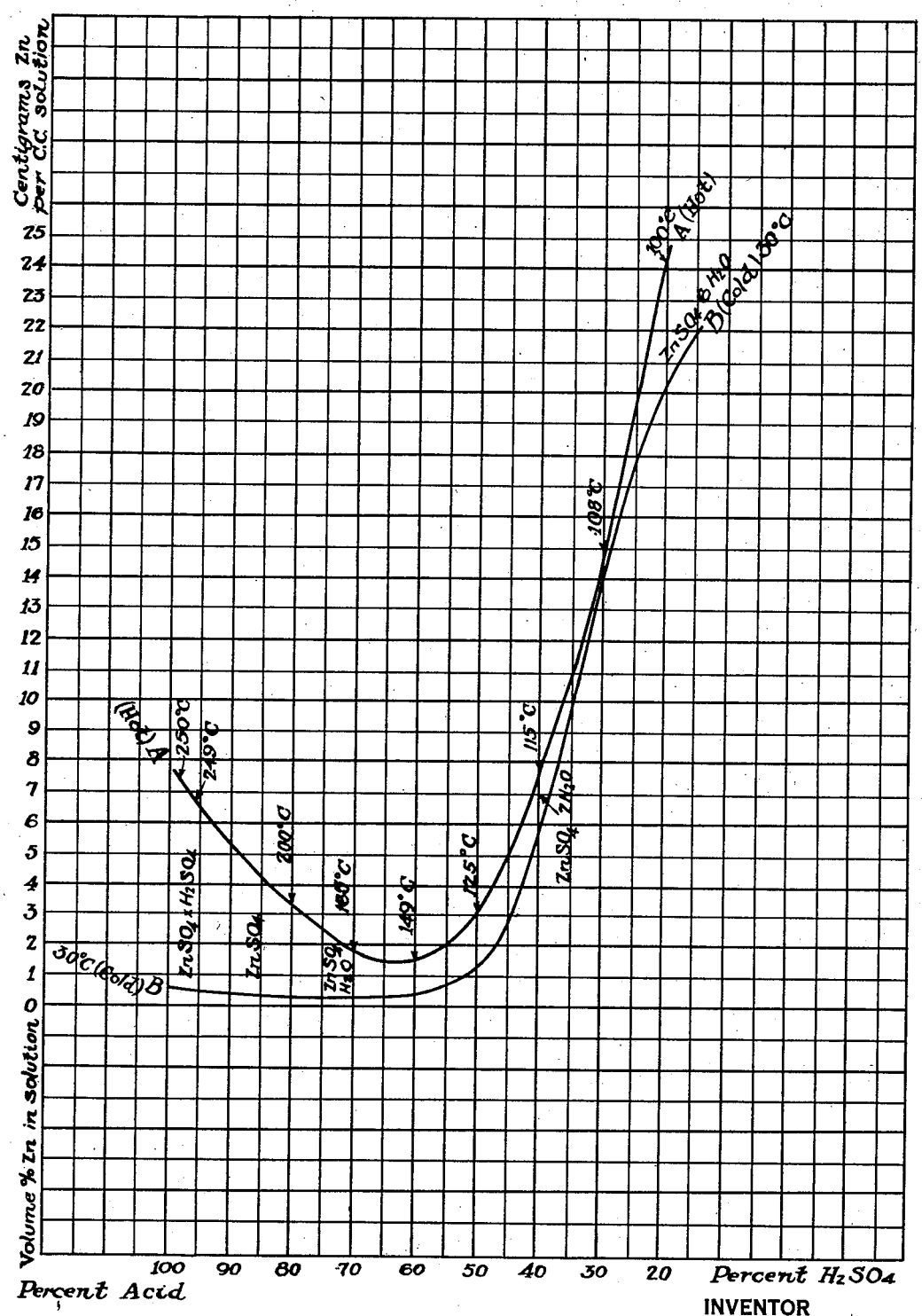

Dec. 5, 1933.   N. C. CHRISTENSEN   1,937,631
PROCESS OF TREATING ZINC ORES
Filed March 18, 1931   6 Sheets-Sheet 4

INVENTOR
Niels C. Christensen

Patented Dec. 5, 1933

1,937,631

UNITED STATES PATENT OFFICE 1,937,631

PROCESS OF TREATING ZINC ORES

Niels C. Christensen, Salt Lake City, Utah

Application March 18, 1931. Serial No. 523,575

23 Claims. (Cl. 204—15)

This invention relates to processes for the recovery of zinc from its ores. The invention relates primarily to the treatment of zinc sulphide ores for the recovery of zinc therefrom as metal or as zinc sulphide. The main object of the invention is to treat the raw sulphide ores by hydrometallurgical methods without roasting the ores and to finally recover the zinc from them either as a metal by electrolysis or as a pure precipitated sulphide which may be used as such or from which the metal may be recovered also by electrolysis. It is also an object of the invention to recover the sulphur combined with the zinc in the sulphide ores as H2S for use in precipitating the zinc as ZnS (or for other uses) or for the recovery of elemental sulphur therefrom. In the treatment of the sulphide ores of zinc by this invention a smaller proportion of oxidized or carbonate ore of zinc is also treated and it is also an object of the process to recover the zinc from such ores. The chemical reagent used in the recovery of the zinc from these ores is sulphuric acid, used in suitable varying concentrations in the different steps of the process. It is an object of the invention to recover the H2SO4, used in decomposing the ores and dissolving the zinc out of the ores, either as such for further use in the process or in other marketable product.

The invention is related to the processes disclosed in my U. S. Patents 1,434,084, 1,415,797, 1,435,699, in that it utilizes some of the discoveries described in these patents. It aims however, to obviate certain defects and limitations of the older process which militate against their practical use and also aims to recover the zinc in final finished products other than zinc sulphate. The invention accomplishes these purposes by a combination of new steps with some of the steps of these older processes and also in combination with other processes now in common use. By these combinations the invention secures results which cannot be secured by the older processes and which are of great value and importance in connection with the treatment of zinc ores. The invention is applicable to the treatment of all classes of zinc ores such as zinc sulphide ores and concentrates and the so-called complex or mixed lead-zinc sulphide ores and concentrates, and is also applicable to the treatment of a proportion of oxidized or carbonate ores of zinc or mixed carbonate ores of zinc and lead in connection with the treatment of the sulphide ores. The terms "sulphide ores of zinc" and "oxidized zinc ores" will therefore be used in the description to cover these various types of ores.

As described in my U. S. Patent #1,434,084. if finely ground zinc sulphide ores or concentrates are mixed with a large excess of hot sulphuric acid of a concentration of 60% or higher the zinc is dissolved in the excess of hot acid as zinc sulphate and the sulphur is driven off as H2S, the reaction proceeding as indicated below;

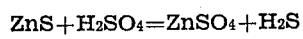

$$ZnS + H_2SO_4 = ZnSO_4 + H_2S$$

As noted in this patent, acids of concentration less than 60% have some dissolving action upon most zinc sulphide ores but a practically complete extraction of the zinc is possible only with acids of a concentration of 60% or higher. For example, in the treatment of a typical zinc-lead sulphide ore from Pioche, Nevada, treatment with hot 40% acid gave an extraction of only 32% of the zinc, with 50% acid an extraction of 55%, with 60% acid an extraction of 95%, with 65% acid an extraction of 98%, and with 75% acid 99%. As noted in the above patent the rate of action of the hot acid upon the zinc sulphide and other constituents of the ore also varies with the concentration. Up to a concentration of approximately 70% the hot acid reacts with the ZnS to form H2S but above this concentration sulphur is liberated in increasing amounts with increase in acid concentration until with 95% acid substantially all of the sulphur is released as elemental sulphur as indicated in the following equation:

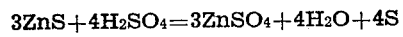

$$3ZnS + 4H_2SO_4 = 3ZnSO_4 + 4H_2O + 4S$$

Acids of a concentration up to 60% have little action upon galena except to form a thin superficial coating of PbSO4 with the more concentrated acid. With increase in acid concentration above 60% more of the lead is sulphated until with 80% acid the sulphating may be complete with very finely ground ores. Up to approximately 70% concentration the silver in the ore is not dissolved to any appreciable extent but above this concentration is dissolved in increasing proportion with increase in acid concentration. Only the very concentrated hot acids have any action upon pyrite or chalcopyrite, even 95% acid having no appreciable action in the time of treatment required for the extraction of the zinc.

Figure 2:
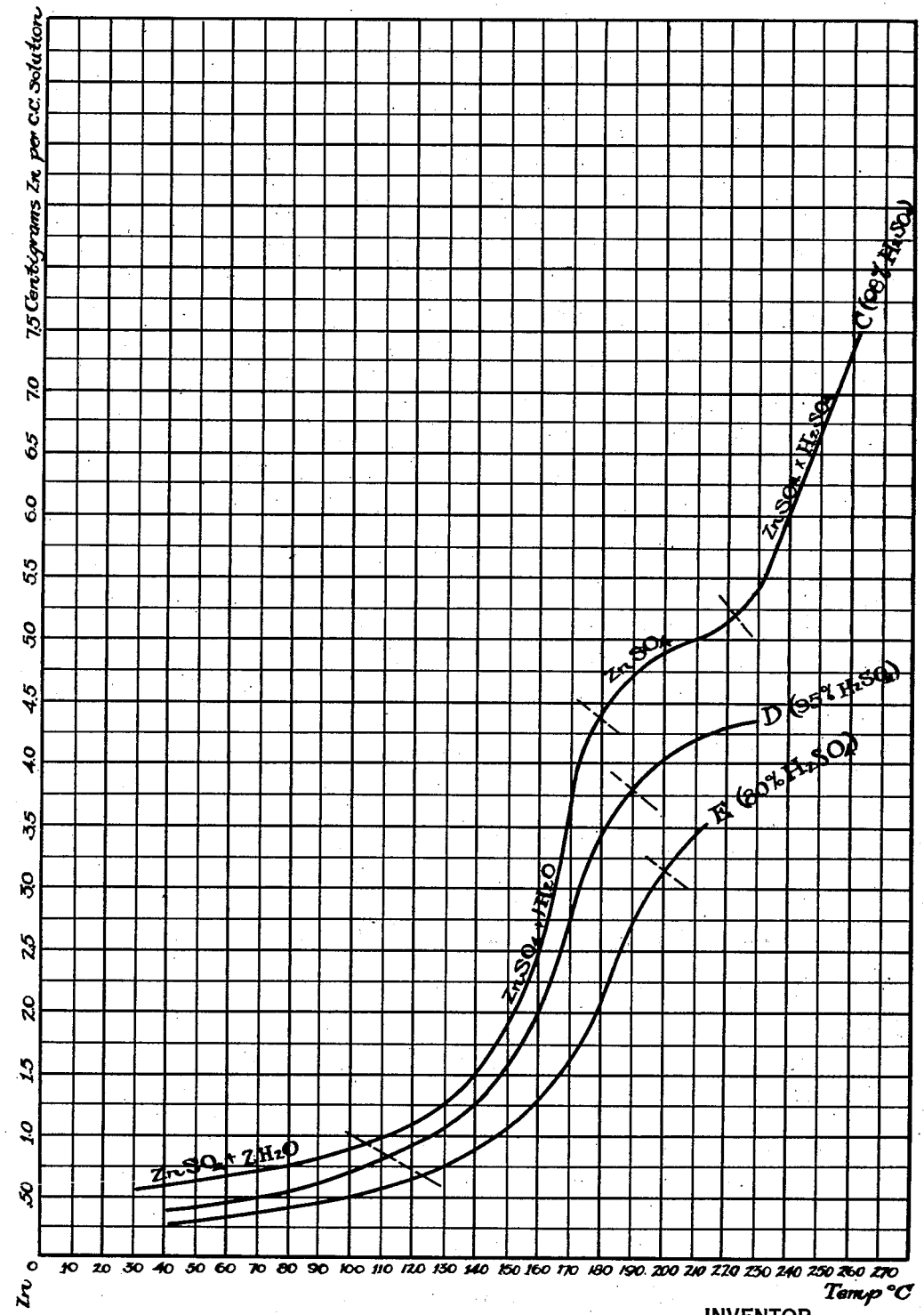
Figure 3:
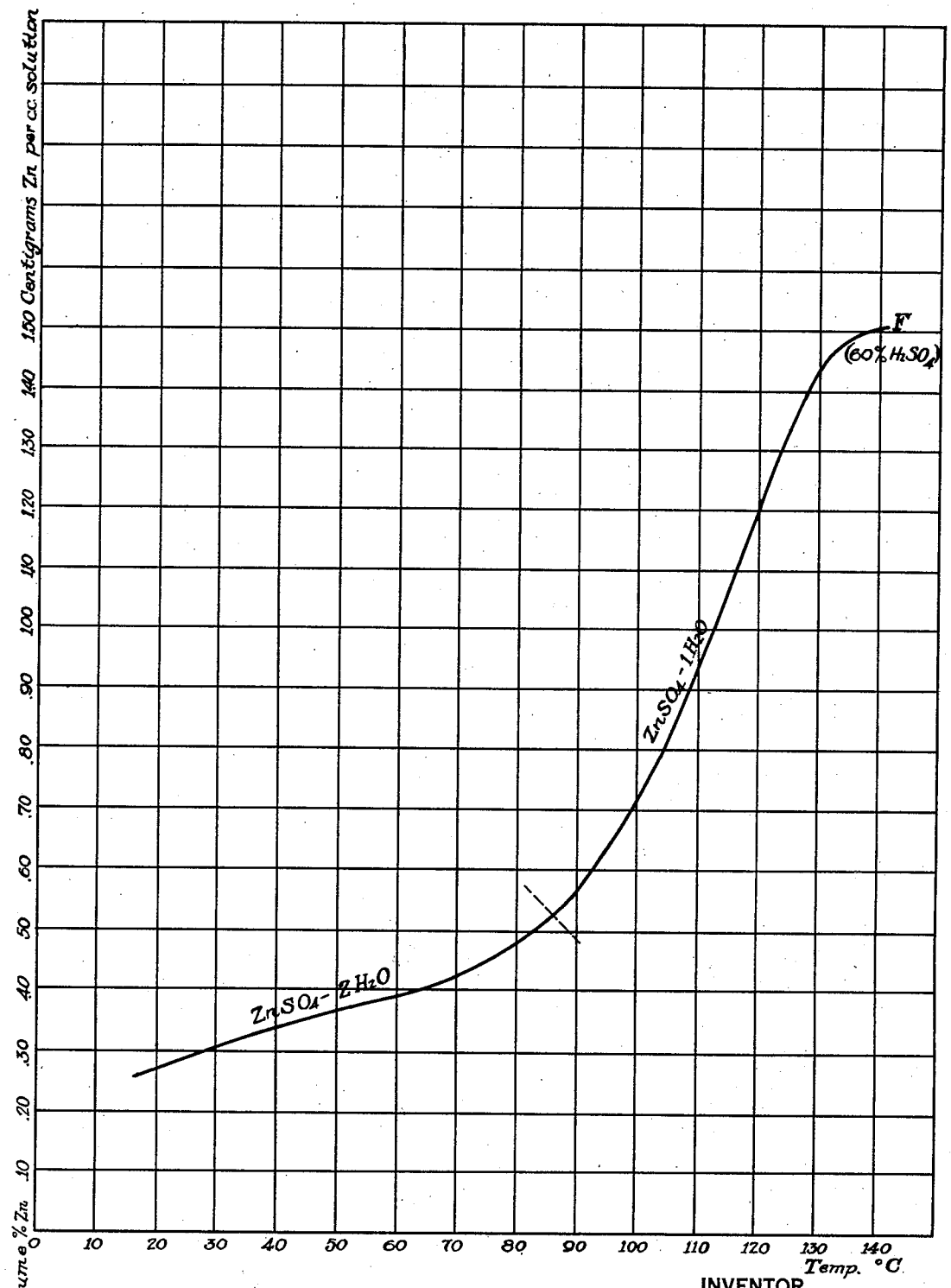

As noted in U. S. Patent 1,434,084, the solubility of ZnSO4 in H2SO4 varies greatly with change in concentration and temperature. The appended curves from U. S. Patent 1,434,084 show this variation in solubility. Fig. 1 consists of two curves, A showing the solubility of $ZnSO_4$ in $H_2SO_4$ of varying concentration at the boiling point of the different acids, and B showing the solubility of $ZnSO_4$ in $H_2SO_4$ of varying concentration at 30° C. Fig. 2 consists of three curves, A, B, and C, showing the solubility of $ZnSO_4$ in 98%, 95% and 80% acids respectively at different temperatures. Figure 3 consists of one curve showing the solubility of $ZnSO_4$ in 60% $H_2SO_4$ at different temperatures. As also noted in this patent (U. S. P. 1,434,084) to secure a substantially complete recovery of the Zn from the sulphide ores by agitation in mixture with the hot sulphuric acid it is necessary to use a sufficient excess of acid to dissolve the $ZnSO_4$ which is formed, as otherwise the Zn is not sulphated and is not recovered either in the hot acid or in the subsequent water wash. A complete recovery of the zinc from these ores therefore requires the use of a very large quantity of acid. For example, if 65% acid is used, this acid will hold 1.3% Zn in solution (as $ZnSO_4$) hot and .2% Zn cold, giving maximum available carrying power 1.1% Zn (as $ZnSO_4$). As complete saturation results in poor extraction, a practical carrying power of the acid is one volume percent zinc, i. e., 1 gram of zinc per 100 c. c. of acid. Since the specific gravity of 65% acid is 1.56 the acid in the mill circuit could dissolve only .64 grams of zinc per 100 grams of acid out of the ore as $ZnSO_4$. The treatment of each ton of 19% ore would therefore require the handling of 30 tons of $H_2SO_4$ and the treatment of one ton of 58% zinc sulphide concentrate would require the handling of over 90 tons of acid. The handling of such large amounts of hot acid militates very seriously against the use of the process, which has therefore never come into practical commercial use. To attempt to cut down the volume of acid required by using acids above 70% is also not feasible owing to the very much greater difficulty of handling the more concentrated acids and the relatively slight decrease in tonnage of acid due to the increased specific gravity of the acids of higher concentration.

In treating zinc sulphide ores by the above process by agitating the ores with the hot sulphuric acid, I have found, as noted above, that sufficient hot acid must be used to dissolve the $ZnSO_4$ formed as otherwise a superficial coating of $ZnSO_4$ is formed around the zinc sulphide particles which prevents entirely all further action of the acid on the particle. I have also found that if this zinc sulphate coating is continuously removed during the treatment with the hot acid that the sulphating action continues until the zinc sulphide particles are all converted to $ZnSO_4$, the sulphur being driven off as $H_2S$, as indicated in the following equation:

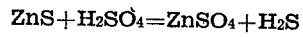

$$ZnS + H_2SO_4 = ZnSO_4 + H_2S$$

The present invention is based on my discovery that this zinc sulphate coating may readily be broken up or removed by grinding with small balls or pebbles during the treatment with the hot acid, making possible a complete sulphating of the ZnS in the ore by a treatment of from 15 to 30 minutes with only sufficient acid to make a thin pulp with the ore. The $ZnSO_4$ thus formed remains as a solid mixed with the residual unattacked ore particles (silica, pyrite, galena, etc.). To recover the zinc sulphate from this mixture the excess acid is first removed by filtration (for reuse in the treatment of more ore) and the $ZnSO_4$ and residual acid are then removed by washing with spent electrolyte from an electrolytic circuit or with water to form an acid zinc sulphate solution. This acid zinc sulphate solution contains some iron, manganese and other impurities which may be removed as later described.

In this treatment of the zinc sulphide ores by grinding with hot $H_2SO_4$ I have also found that the sulphating effect varies with the acid concentration. Acids below 50% have little effect. With from 50% to 60% acid the sulphating increases rapidly, and for best results the acid concentration should be above 60% during the entire treatment, preferably 65%. Since the sulphatizing of the ZnS uses up acid and reduces the acid concentration, sufficient excess acid above 60% in concentration must be used so that the acid concentration does not fall below 60% (or preferably 65%) during the treatment, i. e. before all the $ZnSO_4$ is sulphated.

I have also found that the sulphating action is efficient and rapid only when the acid is near or at its boiling point and the treatment should therefore be carried out with the acid held at this temperature. The sulphating action of the hot acid during the grinding varies with concentration, the stronger acids acting more rapidly on the ZnS and sulphating any PbS in the ore to a somewhat greater extent than when the ore is not ground during treatment with the acid. Whether acids stronger than 65% are used in the treatment of mixed Pb—Zn sulphide ores may depend upon whether or not it is desired to sulphate the lead in the ore. Acids above 70% form S instead of $H_2S$ in proportion to the increase in concentration and cause a loss of acid and $H_2S$, and are therefore not preferred over the acids of lower concentration for this reason as well as the greater difficulty of handling the more concentrated acid.

As an example of the proportions of acid and ore to be used in the sulphation process, and to which the present invention is not limited, I give the following: If an ore contains 19% of Zn in the form of ZnS, and the rest of the ore is gangue which does not combine with $H_2SO_4$ then for one ton of the ore, 570 lbs. of actual $H_2SO_4$ would be consumed in the reaction. With a high grade concentrate containing 58% of zinc (as sulphide) 1740 lbs. of $H_2SO_4$ would similarly be consumed. In addition to these amounts, I may add enough of the acid to maintain a fluid pulp, say an excess over the theoretical of about 1 to 4 tons of acid per ton of ore or concentrate, being suitable. It will be understood that since this acid is already at least partly saturated with zinc sulphate, from previous use in the process, it is not capable of dissolving any considerable part of the $ZnSO_4$ formed in the sulphation treatment.

The foregoing method of grinding the ZnS ore during treatment with the hot acid makes possible the extraction of the zinc from these ores by the use of a relatively small amount of acid as compared with the older process mentioned above. It also avoids the necessity of heating and cooling the acid used for treating the ore to precipitate the $ZnSO_4$ therefrom, the $ZnSO_4$ being formed as a solid and the hot excess acid filtered away from the solid $ZnSO_4$ and residue being reused in the treatment of more ore. From the mixture of $ZnSO_4$ and ore residue thus secured the $ZnSO_4$ may be recovered by washing with the spent electrolyte from an electrolytic circuit thus making possible the combination of this process with electrolytic processes for the recovery of the zinc in metallic form as described below. From the mixture of ore residue and solid $ZnSO_4$ secured in the process as above described, the $ZnSO_4$ may also be dissolved if preferred, by means of water to form a zinc sulphate solution from which the zinc may be recovered as ZnS, by means of the $H_2S$ made in the process, as more fully described below. The precipitated ZnS thus recovered may be used as a paint pigment or for other similar purposes or may also be treated by electrolysis for the recovery of the zinc as metal as described below.

Figure 4:
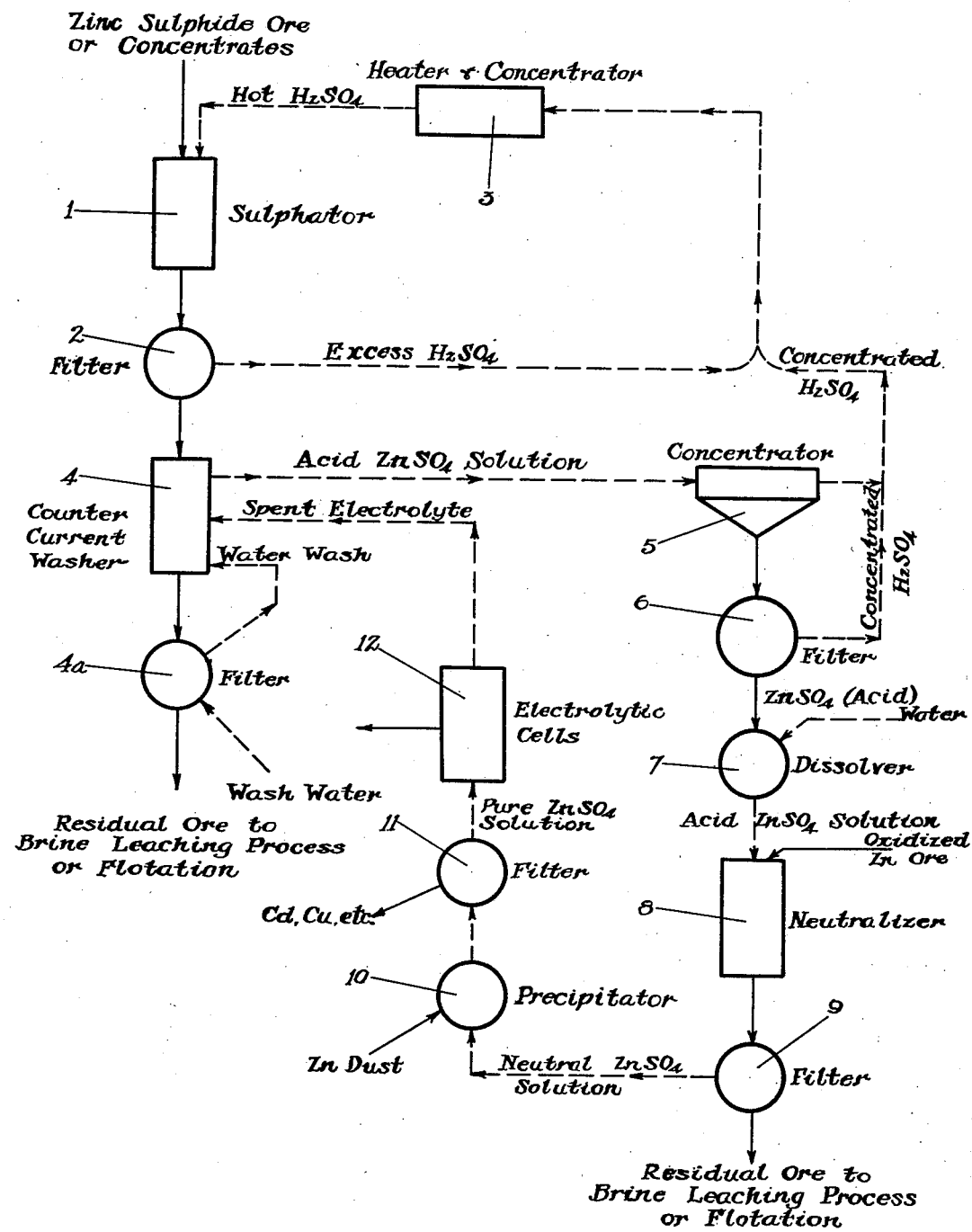
Figure 5:
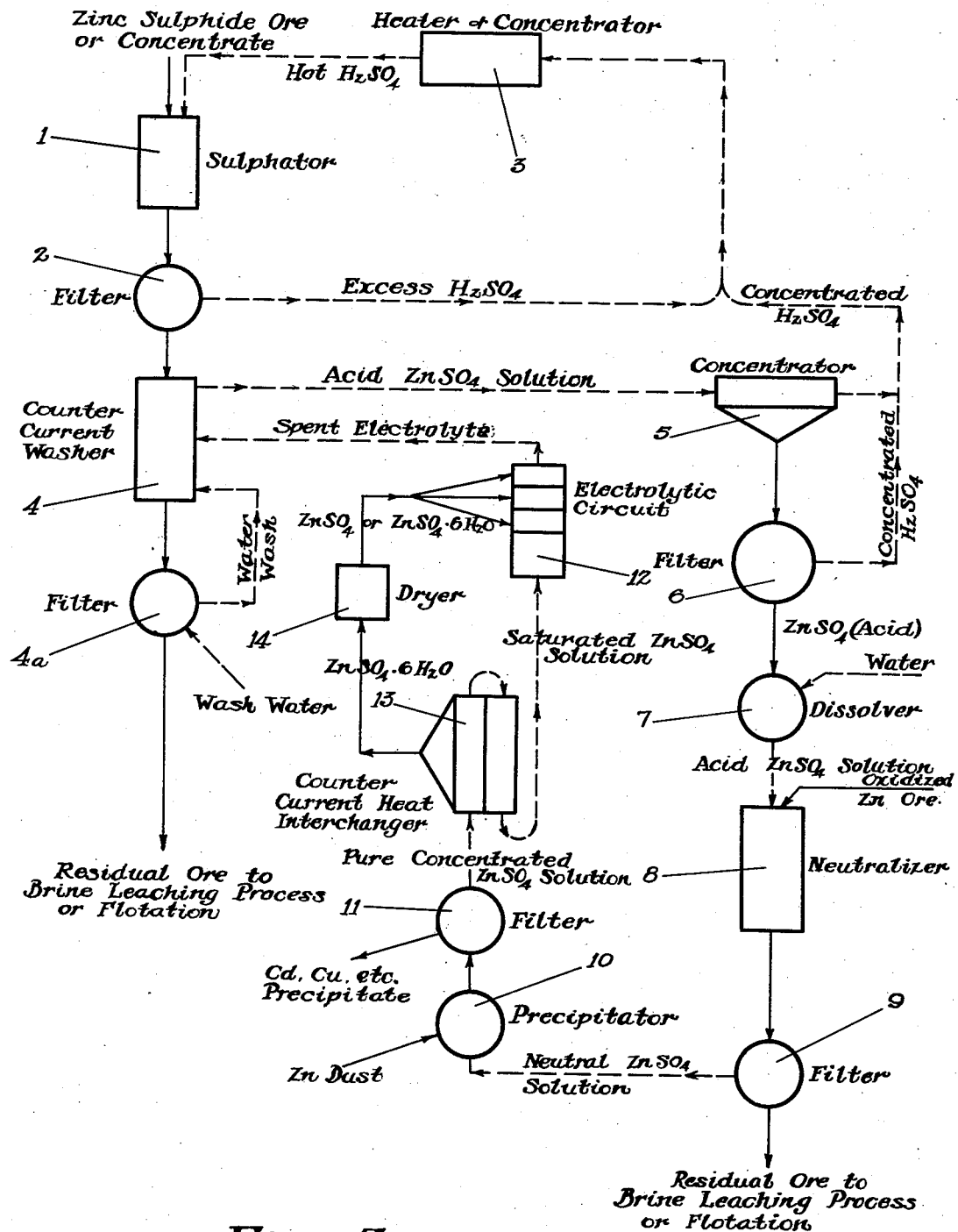
Figure 6:
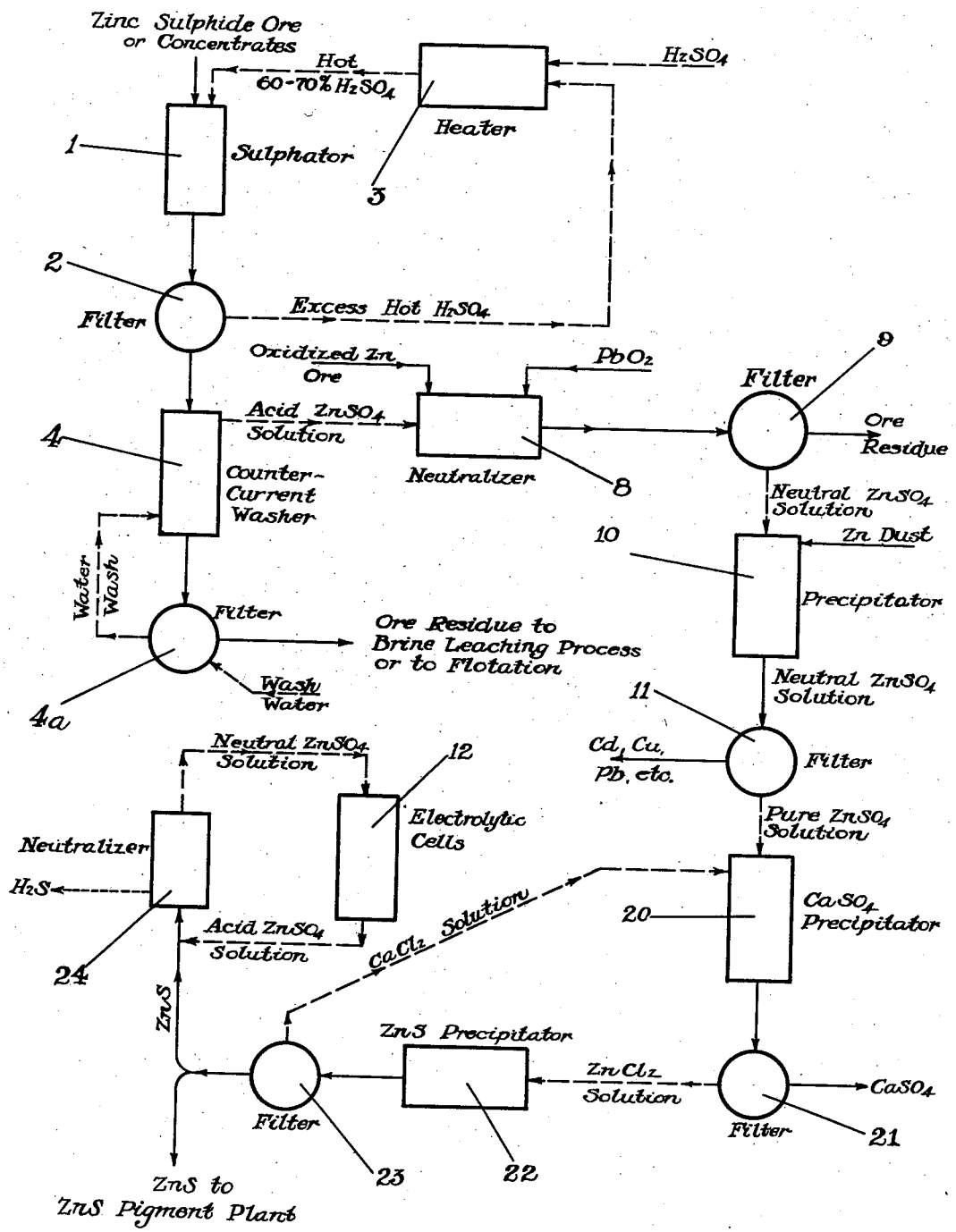

The application of the invention to ores of different types is briefly covered in the following description. The accompanying drawings illustrate the description and show in diagram the different steps of the process. Figure 4 is a flow-sheet of the process as applied in connection with a low acid electrolytic circuit for the recovery of the zinc from solution as a metal. Fig. 5 is a flow sheet of the process used in connection with a high acid electrolytic circuit. Fig. 6 is a flow sheet of the process as applied in connection with the recovery of the zinc as a sulphide and the treatment of the sulphide by electrolysis for the recovery of the zinc as a metal. Though the flow sheets illustrate a continuous operation, the process may be carried out in batches.

The process of Fig. 4 is briefly as follows: the ZnS, the finely comminuted zinc sulphide ore or concentrate is first ground together with the hot sulphuric acid with small quartz pebbles (or other acid-proof material), in an acid-proof mill (or other suitable grinding or attrition apparatus), called the sulphator (1). This device is kept hot by suitable jackets for the circulation of a suitable heating fluid. The time of treatment necessary to secure substantially complete sulphating of the ZnS for most ores will vary from 10 to 20 minutes. With acids of the preferred concentration (between 60% and 70%) the sulphur is driven off in this treatment as $H_2S$, which is utilized as later described. The hot mixture of excess acid, $ZnSO_4$ and ore residue from the sulphator (1) goes to the filter (2) where the excess acid is separated from the solids and returned through the heater and concentrator (3) to the head of the circuit for use in treating more ore. The filter cake containing the $ZnSO_4$ and ore residue is next washed free from $ZnSO_4$ and acid with spent electrolyte and finally with water preferably in a counter-current washer (4), or a washing system such as the standard arrangement of Dorr thickeners, or the standard arrangement of a series of filters for counter-current washing, or other suitable washing device. If the standard, or low acid, electrolytic process, such as that in use at Anaconda or Trail, is used, the spent electrolyte used for this washing operation may contain in the neighborhood of ten per cent $H_2SO_4$ and 5% Zn. This solution is first used to dissolve all the $ZnSO_4$ possible out of the filter cake and thereafter the residual $ZnSO_4$ and acid are washed away from the residue of treated ore with water. As will be noted by reference to the Fig. 1, a hot 10–15% $H_2SO_4$ will hold over 20% Zn as $ZnSO_4$ so that there is no difficulty in dissolving an amount of zinc equivalent to that precipitated in the electrolytic circuit from the sulphated ore in the spent electrolyte. The acid zinc sulphate washes from the counter current washer (4) are preferably mixed and concentrated in a suitable evaporator or concentrator (5) until the concentration of the acid reaches approximately 60% (or slightly more). As will be seen by reference to Fig. 1, this results in the precipitation of nearly all the $ZnSO_4$. This concentration is preferably carried out in three or more steps, the precipitated $ZnSO_4$ being removed at the end of each step so as to avoid the formation of an excessively thick $ZnSO_4$ sludge toward the end of the concentrating operation. This step is also preferably carried out in counter-current using the water evaporated from the acid $ZnSO_4$ solution to dissolve the precipitated $ZnSO_4$ and thus balance the heat of solution of the $ZnSO_4$ in the water against the heat of concentration of the acid solution. The precipitated $ZnSO_4$ is filtered out of the concentrated acid on the filter (6) and the acid is returned to the head of the circuit for the treatment of more ore. The precipitated $ZnSO_4$ containing some residual acid is dissolved in water (preferably from the concentrating operation as described) in the mixer or dissolver (7) to form a zinc sulphate solution. This solution contains some impurities such as iron, manganese, cadmium, etc., dissolved out of the ore together with the zinc. To remove these impurities oxidized zinc ore is mixed with this acid zinc sulphate solution in the neutralizer (8) to neutralize the acid. After the acid has been neutralized in the neutralizer (7), sufficient oxidizing agent (preferably $PbO_2$) is added to the mixture which is then agitated until the iron and other oxidizable impurities are precipitated. The residue of leached oxidized ore is then separated from the neutral zinc sulphate solution by filtration in the filter (9) and the zinc sulphate solution is treated with zinc (preferably zinc dust) to remove cadmium, copper, etc., in the precipitator (10). After separation of the precipitate in the filter (11) the pure zinc sulphate solution is electrolyzed in the electrolytic cells (12). The spent electrolyte from these cells (12) is again passed through the leaching circuit to take up its fresh load of zinc sulphate as described. If no oxidized ores or zinc calcines are available for neutralization of the acid in the $ZnSO_4$ filter cake from the filter (6) or if it is not desired to treat oxidized ores, this $ZnSO_4$ filter cake may be heated sufficiently to drive off the $H_2SO_4$ leaving anhydrous $ZnSO_4$, which is then dissolved in water to make a neutral zinc sulphate solution. The oxidizable impurities such as iron, etc., are then precipitated from the solution by the addition of an oxidizing agent, such as lead peroxide, and a small amount of zinc oxide or zinc carbonate ore. Thereafter the cadmium, copper, traces of Pb, etc., are precipitated by means of zinc dust and the clean zinc solution electrolyzed as previously described, the spent electrolyte being used over again to dissolve more $ZnSO_4$ out of more sulphated ore.

The treatment of the leached residue from the counter current washer (4) and filter (4a) will depend upon the character of the residue. If it contains lead it may be treated by the brine leaching process described in my U. S. Patent 1,539,711 for the recovery of the lead and silver, and the residue from this treatment may be treated by flotation to recover the pyrite which carries the gold and residual silver in the ore. If the residue contains no lead it may be treated by flotation for the recovery of the pyrite and gold and silver.

The treatment of the residue of oxidized ore from the neutralizer will also vary with the character of the residue. If it contains lead which after treatment will be present as lead sulphate, this may be recovered by leaching with brine, which may be slightly acidified so as to recover any silver in the ore.

Figure 5 shows a modification of the process as applied to recovery of the zinc by electrolysis in a high acid electrolyte such as is used in the Tainton process. As will be noted by comparing the flow sheets of Figs. 4 and 5, substantially the only difference in the two cases is in the addition of part of the pure zinc sulphate in solid form in successive cells of the electrolytic plant so as to keep up the zinc concentration in the electrolyte as the acid concentration increases, and in the use of a higher acid concentration and a higher current density, and in the dissolving of the zinc sulphate out of the sulphated ore in a spent electrolyte of much higher acid concentration, and in the use of a much more concentrated neutral zinc sulphate solution entering the electrolytic plant. The spent electrolyte from the electrolytic cells (12) in this case may carry 300 g. $H_2SO_4$ (or more) and approximately 80 g. (or more) of Zn (as $ZnSO_4$) per litre. By reference to Fig. 1 it will be seen that this solution can carry between 14 and 15% Zn (as $ZnSO_4$). The spent electrolyte is therefore able to take up an additional 6%–7% Zn in the counter-current washer (4), the residual $ZnSO_4$ being washed out with water in the filter (4a) and counter-current washer (4). In this case the $ZnSO_4$ from the filter (6) is dissolved with just sufficient hot water in the dissolver (7) and neutralized with the oxidized ore in the neutralizer (8) so as to form a hot approximately saturated $ZnSO_4$ solution. After treating this solution with zinc dust to remove cadmium copper, and other impurities, this hot concentrated solution is cooled in the counter-current heat interchanger and crystallizer (13) thus precipitating out part of the $ZnSO_4$ as $ZnSO_4$—$6H_2O$ and cooling the solution before its entrance to the electrolytic circuit (12). The precipitated $$ZnSO_4-6H_2O$$

is added to the cells near the end of the electrolytic circuit as indicated in the flow sheet to maintain a sufficiently high zinc concentration, as the acid builds up in the circuit, to permit the use of a high acid concentration and high current density. If desired, the $ZnSO_4 \cdot 6H_2O$ may preferably be heated in a suitable dryer (14) to form anhydrous $ZnSO_4$ before its addition to the electrolytic circuit. Either the $ZnSO_4 \cdot 6H_2O$ or the anhydrous $ZnSO_4$ are preferably added to the electrolytic circuit by dissolving in the electrolyte in suitable agitators between separate divisions of cells in the latter part of the circuit. By the addition of the $ZnSO_4$ to the solution in the electrolytic circuit it is possible to operate with a very high acid concentration and high current density without depleting the zinc in the circuit below the limit necessary to secure a high current efficiency. For example, starting with a substantially saturated neutral electrolyte carrying 200 g. Zn per litre, it is possible to precipitate all of this zinc by the independent addition of more $ZnSO_4$ as the zinc in solution is depleted. It is thus possible to operate with acid concentrations of 30% to 35%, or even slightly higher, since these solutions will carry from 114 to 110 g. of zinc per litre which is sufficient to give an economical current efficiency at very high current densities. It is thus possible by operating at these high current densities to cut the required anode and cathode surface in the electrolytic plant to less than half of that required in the circuit ending with the lower acid electrolyte.

If it is desired to operate the electrolytic circuit with very concentrated $ZnSO_4$ solution and low acid concentration so as to be able to use a very high current density with a high current efficiency this may be done by the modification of the process shown in Fig. 6. In this case the zinc sulphide ore or concentrate is treated in the sulphator (1) with the hot acid (60–70% $H_2SO_4$) as previously described. The excess of hot acid is separated in the filter (2) and returned to the head of the circuit for the treatment of more ore, through the heater (3) in which the fresh acid consumed in treating the ore is also added as indicated. The $ZnSO_4$ is then washed out of the filter cake from (2) with water in a suitable washer (4) (preferably a counter current type) and filter (4a). The tailings from this treatment may go to a brine leaching or flotation treatment as previously described. The acid $ZnSO_4$ solution from the washer (4) is now neutralized with oxidized zinc ore (or zinc calcines) in a suitable agitator or neutralizer (8) and the impurities oxidized with a suitable oxidizing agent (such as lead peroxide) and the iron and other impurities removed together with the residue of treated oxidized ore in the filter (9). If it is not desired to treat oxidized zinc ores the acid $ZnSO_4$ solutions may be concentrated to 60% $H_2SO_4$ and the precipitated $ZnSO_4$ may be filtered out of the concentrated acid and dried to form anhydrous $ZnSO_4$ by heating to drive off the $H_2SO_4$. The anhydrous $ZnSO_4$ may then be dissolved in water and the impurities may be oxidized and precipitated as previously described to form the neutral $ZnSO_4$ solution. The neutral $ZnSO_4$ solution is then treated with zinc dust in the precipitator (10) to precipitate the traces of lead and the copper and cadmium, which are removed from solution in the filter (11). The clean neutral $ZnSO_4$ solution is now mixed with a $CaCl_2$ solution in the precipitator (20) precipitating the sulphion from solution as $CaSO_4$ and forming a $ZnCl_2$ solution as indicated in the following equation:

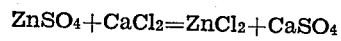
$$ZnSO_4+CaCl_2=ZnCl_2+CaSO_4$$

(The $CaSO_4$ is separated from the $ZnCl_2$ solution in the filter (21). The zinc is then precipitated from this zinc chloride solution in the precipitator (22) by means of the $H_2S$ generated by treatment of the zinc sulphide ore in the sulphator (1) and a suitable lime compound by one of the following methods: the solution may be treated with $H_2S$ together with finely divided $CaCO_3$ as described in my U. S. Patent Application 66,400 now Patent No. 1,886,162 thus precipitating the zinc as ZnS and forming $CaCl_2$ in solution as indicated in the following equation:

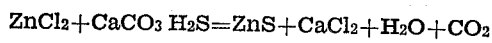
$$ZnCl_2+CaCO_3\ H_2S=ZnS+CaCl_2+H_2O+CO_2$$

or the $H_2S$ may be absorbed in a suspension of $Ca(OH)_2$ to form a $Ca(SH)_2$ solution and this solution may be used to precipitate the zinc directly as indicated in the following equation:

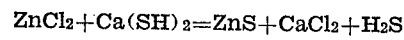
$$ZnCl_2+Ca(SH)_2=ZnS+CaCl_2+H_2S$$

or preferably by mixing the $Ca(SH)_2$ solution with finely divided $CaCO_3$ in equimolecular proportion to the Ca(SH)$_2$ and using this mixture to precipitate the zinc as indicated below:

$$2ZnCl_2 + Ca(SH)_2 + CaCO_3 = 2ZnS + 2CaCl_2 + CO_2 + H_2O$$

and as described in my copending U. S. Application Nos. 493,685 filed Nov. 5, 1930 and 565,153 filed Sept. 25, 1931. In all these processes the zinc is precipitated as ZnS and the chlorine remains in solution as CaCl$_2$. The CaCl$_2$ solution thus formed is used to precipitate the CaSO$_4$ as described above and as indicated in the flow sheet of Fig. 6. The CaSO$_4$ (filtered out in the filter (21) may be used for making high grade gypsum plaster or for other purposes. The precipitated zinc sulphide is filtered out of the CaCl$_2$ solution in the filter (23) and treated with exit solution from the electrolytic circuit (12), in the neutralizer (24), the acid in the solution being neutralized and the solution regenerated by the formation of ZnSO$_4$, and the H$_2$S being driven off as indicated in the following equation:

$$ZnS + H_2SO_4 = ZnSO_4 + H_2S$$

A concentrated ZnSO$_4$ solution (preferably hot) is used in closed circuit with the neutralizer (22) and electrolytic cells (12) and is rapidly circulated so as to prevent the acid generated by the electrolysis building up to any appreciable concentration. All the cells in the electrolytic circuit may thus be operated continuously with a nearly neutral hot concentrated zinc sulphate solution, making it possible to use very high current densities with a high current efficiency. The H$_2$S generated in the neutralizer may be returned to the sulphhydrate plant or may be burned in a Claus kiln to recover the sulphur, or may be utilized for other purposes. Traces of chlorine may be removed from the neutralized solution before its return to the electrolytic cells by the addition of silver sulphate to the solution. The silver chloride thus precipitated may be treated to form silver sulphate again and the silver thus be used over again for this purpose.

If desired the ZnS from the filter (23) may be dried and heated to form a zinc sulphide paint pigment as described in my U. S. Patent Applications Nos. 493,685 and 565,153 instead of going to the electrolytic plant.

As previously noted the process is adapted to the treatment of all classes of zinc sulphide ores and concentrates and together with these for the treatment of oxidized or carbonate ores. It is especially adapted, when used in connection with the brine leaching process of my U. S. Patents 1,539,711 and 1,539,712, for the treatment of bulk concentrates from complex lead-zinc-iron sulphide ores, and for the treatment of mixed lead zinc carbonate ores. By this combination of processes the zinc is first extracted from the concentrates by the process described above and the lead and silver are then extracted by the brine leaching process mentioned above. The pyrite and residual silver and the gold may then be recovered from the brine-leached residue in pyrite concentrates, by flotation and the pyrite concentrate may then be treated by the cyanide process, preferably after a chloridizing roast, for the recovery of the silver and gold, leaving a high grade iron product which may be marketable. The SO$_2$ produced in roasting the pyrite concentrate may be used for the production of H$_2$SO$_4$, liquid SO$_2$ or may be mixed with the H$_2$S from the leaching operations to produce sulphur as indicated in the following equation:

$$2H_2S + SO_2 = 2H_2O + 3S$$

By such a combination of processes used in connection with this invention, described herein, a substantially complete recovery of all the metals in a complex lead-zinc-iron sulphide ore may be recovered in valuable marketable products.

From the foregoing it will be seen that my invention utilizes the following discoveries which I have made in treating zinc ores with sulphuric acid: 1st, the fact that hot sulphuric acid above a concentration of 50% reacts with the zinc sulphide minerals to form ZnSO$_4$; 2nd, that the minimum range of solubility of ZnSO$_4$ in hot concentrated H$_2$SO$_4$ is in acids of concentrations between 50% and 70%; 3rd, that the reaction between ZnS and hot concentrated H$_2$SO$_4$ from 50% to approximately 70% is as follows—

$$H_2SO_4 + ZnS = ZnSO_4 + H_2S;$$

4th, that in treating ZnS ores with hot H$_2$SO$_4$ of the above concentrations, even if very much less acid than is required to dissolve all the zinc sulphate is used (without a grinding operation) a superficial coating of zinc sulphate is formed on the sulphide particles which prevents further reaction between the ZnS and the acid; 5th, that by grinding the ore during treatment with the hot acid, this coating may be so broken up or separated from the ZnS particles that the sulphating action may go to completion.

The present invention accordingly is based upon recognition of the above factors, and includes a process of handling zinc sulphide ores based thereon, which involves the economical handling of the ores (concentrates or other metalliferous materials) with minimum amounts of hot concentrated sulphuric acid, and the eventual recovery of the zinc in a metallic or other commercial form, capable of being commercially practiced.

The treatment of lead sulphide ores by a sulphation process analogous to that described and claimed herein, and the treatment of lead-zinc sulphide ores by a sulphation process analogous to that described and claimed herein are particularly claimed in my copending applications, Ser. No. 565,861 filed September 29, 1931 and Ser. No. 568,514 filed October 12, 1931.

Having described my process what I claim and desire to patent is:

1. In the treatment of finely divided zinc ores, concentrates and the like with sulphuric acid to convert the zinc sulphide therein into solid zinc sulphate, the process which consists in grinding said comminuted material in admixture with hot sulphuric acid in the range of concentration in which the solubility of the zinc sulphate in the hot acid is near the minimum, such sulphuric acid being in an amount substantially in excess over that stoichiometrically equivalent to the zinc in the ore material, but only a minor fraction of that amount which would be necessary to dissolve all of the zinc sulphate produced from the zinc sulphide, and thereby converting zinc sulphide in said material directly into zinc sulphate, substantially all in solid form, and separating the excess of said sulphuric acid containing only a very minor fraction of the total zinc sulphate in solution, from the treated ore material, while the latter contains the main bulk of the zinc sulphate produced in such operation, for reuse in treating more of the said zinc ore material, the main bulk of the zinc sulphate present at any one time being in the solid state.

2. The process of treating ores and ore concentrates containing substantial amounts of zinc sulphide, which comprises grinding said material while in admixture with hot sulphuric acid in the range of concentration in which the solubility of zinc sulphate in the hot acid is near the minimum, such sulphuric acid being in an amount substantially in excess over that stoichiometrically equivalent to the zinc in the ore material, but only a minor fraction of that amount which would be necessary to dissolve all of the zinc sulphate produced from the zinc sulphide, and thereby converting zinc sulphide in said material directly into zinc sulphate in solid form, and thereafter filtering excess acid, while still hot, out of its mixture with said solid zinc sulphate and ore residue and treating more of said material with such residual acid, without first substantially cooling said acid, as described.

3. In the treatment of zinc sulphide ores, concentrates and the like with sulphuric acid to convert the zinc sulphide therein into zinc sulphate, the process which comprises grinding said comminuted zinciferous material, mixed with hot sulphuric acid of about 60 to 70% strength, and in amount much less than that required to dissolve the zinc sulphate in said treatment, the proportions of said zinciferous material and acid being such as to form a thin readily flowable pulp, and thereby decomposing zinc sulphide in said ores and the like and converting it directly into zinc sulphate in solid form.

4. The process of treating zinc sulphide ores, concentrates and the like which comprises grinding said zinciferous material in mixture with hot sulphuric acid of about 55 to 70% strength, and in amount much less than that required to dissolve the zinc sulphate formed in said treatment, and thereby decomposing zinc sulphide in said material and converting it directly into zinc sulphate in solid form, and thereafter filtering excess acid out of its mixture with said solid zinc sulphate and ore residue and treating more of said zinciferous material with such acid while hot.

5. The process of treating zinc sulphide ores and concentrates and the like which comprises grinding such material in hot relatively concentrated sulphuric acid, in amount much less than that required to dissolve the zinc sulphate formed in said treatment, thereby sulphating the zinc sulphide and forming zinc sulphate in solid form, and thereafter filtering the excess of acid out of its mixture with the said solid zinc sulphate and the ore residue and treating more of such material with said acid while hot, and dissolving said zinc sulphate out of said mixture of zinc sulphate and ore residue by treatment of the sulphated material with spent electrolyte from an electrolytic zinc circuit, and concentrating the acid zinc sulphate solution thus formed to make acid of a concentration sufficient to precipitate the greater part of the zinc sulphate therefrom, and filtering said precipitated zinc sulphate from the excess of acid and treating more of said material with said acid, and dissolving remaining zinc sulphate and acid retained with it from said leached sulphated material, in water to form an acid zinc sulphate solution, and neutralizing acid in such latter solution by treatment of said solution with oxidized zinc ore, and precipitating impurities therefrom by means of said oxidized zinc ore and an oxidizing agent, and precipitating metals below zinc in the electromotive series from said solution by treatment with metallic zinc, and electrolyzing the pure zinc solution thus formed for the recovery of zinc therefrom, and bringing the spent electrolyte from said electrolysis into contact with more of said sulphated ore, to dissolve zinc sulphate in said spent electrolyte.

6. The process of treating zinc sulphide ores and concentrates and the like which comprises grinding the said material in hot sulphuric acid in the range of concentration in which the solubility of zinc sulphate in the hot acid is near the minimum and in amount much less than would be required to dissolve the zinc sulphate formed in said treatment, thereby sulphating the zinc sulphide present in said material and forming zinc sulphate therefrom in solid form, and thereafter removing the excess of acid from its mixture with the said solid zinc sulphate and the residue and treating more of said zinc-bearing material with said acid, and dissolving said zinc sulphate out of the sulphatized mixture with spent electrolyte from an electrolytic zinc circuit, and concentrating the acid zinc sulphate solution thus formed to make acid of a concentration sufficient to precipitate the greater part of the zinc sulphate therefrom, and removing said precipitated zinc sulphate from the excess of acid and treating more of the said zinc-bearing material with said acid, and dissolving said zinc sulphate and acid retained with it in water to form an acid zinc sulphate solution, and neutralizing acid in said solution by treatment with oxidized zinc ore, and precipitating impurities therefrom by means of said oxidized zinc ore and an oxidizing agent, and precipitating metals below zinc in the electromotive series from said solution by treatment with metallic zinc, and electrolizing the pure zinc solution thus formed for the recovery of zinc therefrom, and dissolving more zinc sulphate from the sulphated material in the spent electrolyte from said electrolysis.

7. The process of treating zinc sulphide ores and concentrates and the like which consists in grinding the same in hot relatively concentrated sulphuric acid in amount much less than that required to dissolve the zinc sulphate formed in said treatment, thereby sulphating the zinc sulphide and forming zinc sulphate in solid form, and thereafter filtering the excess of acid out of its mixture with the said solid zinc sulphate and the ore residue and using said acid in the treatment of more ore, and dissolving said zinc sulphate out of said mixture of zinc sulphate and ore residue by treatment thereof with spent electrolyte from an electrolytic zinc circuit, and thereafter washing the residual acid and zinc sulphate away from said ore residue with water, mixing said solutions, and concentrating the acid zinc sulphate solution thus formed to make acid of a concentration sufficient to precipitate the greater part of the zinc sulphate therefrom, and filtering said precipitated zinc sulphate from the excess of acid and using said acid in the treatment of more ore, and dissolving said zinc sulphate and acid retained with it in water to form an acid zinc sulphate solution, and neutralizing said retained acid by treatment with oxidized zinc ore, and precipitating impurities therefrom by means of said oxidized zinc ore and an oxidizing agent, and precipitating metals below zinc in the electromotive series from said solution by treatment with metallic zinc, and electrolyzing the pure zinc solution thus formed for the recovery of zinc therefrom, and using the spent electrolyte from said electrolysis for the dissolving of more zinc sulphate from more of the sulphated material as described above.

8. The process of treating zinc sulphide ores and concentrates and the like which consists in grinding said zinc-bearing material in hot sulphuric acid in the range of concentration in which the solubility of zinc sulphate in the hot acid is near the minimum and in amount much less than would be required to dissolve the zinc sulphate formed in said treatment, thereby sulphating the zinc sulphide with the formation of a sulphated product containing zinc sulphate in solid form, and thereafter separating excess of acid from its mixture with the said solid zinc sulphate and the ore residue and returning said acid for the treatment of more ore therewith, and dissolving said zinc sulphate out of said mixture of zinc sulphate and ore residue with spent electrolyte from an electrolytic zinc circuit, and thereafter washing residual acid and zinc sulphate away from said ore residue with water, and mixing said solutions, and concentrating the acid zinc sulphate solution thus formed to make acid of a concentration sufficient to precipitate the greater part of the zinc sulphate therefrom, and removing said precipitated zinc sulphate from the excess of acid and returning said acid for the treatment of more ore therewith, and dissolving zinc sulphate and acid retained in it from the sulphated ore after treatment thereof with spent electrolyte in water to form an acid zinc sulphate solution, and neutralizing acid in said last mentioned solution by treatment with oxidized zinc ore, and precipitating impurities therefrom by means of said oxidized zinc ore and an oxidizing agent, and precipitating metals below zinc in the electromotive series from said solution by treatment with metallic zinc, and electrolyzing the pure zinc solution thus formed for the recovery of zinc therefrom, and returning the spent electrolyte from said electrolysis for the dissolving of more zinc sulphate from sulphated ore as described above.

9. The process of treating zinc sulphide ores and concentrates and the like which consists in grinding the said material in hot relatively concentrated sulphuric acid in amount much less than that required to dissolve the zinc sulphate formed in above said treatment, thereby sulphating the zinc sulphide and forming zinc sulphate in solid form, and thereafter filtering the excess of acid out of its mixture with the said solid zinc sulphate and the ore residue and treating more of said material with said acid, and dissolving zinc sulphate out of said mixture of zinc sulphate and ore residue with spent electrolyte from an electrolytic circuit to form an acid solution containing zinc sulphate, thereafter washing the residual acid and zinc sulphate away from said ore residue with water to form another acid solution containing zinc sulphate, and mixing said acid solutions and concentrating the acid zinc sulphate solution thus formed to an acid concentration sufficient to precipitate the greater portion of the zinc sulphate therefrom, and separating the precipitated zinc sulphate from the excess of acid and treating more of said initial material with said acid, and dissolving said precipitated zinc sulphate and acid retained with it in water to form an acid zinc sulphate solution and neutralizing acid in said latter solution by treatment with oxidized zinc ore material to form a hot concentrated zinc sulphate solution and precipitating impurities therefrom by means of said oxidized zinc ore material and an oxidizing agent, and precipitating metals below zinc in the electromotive series from said solution by treatment with metallic zinc, and cooling the pure hot concentrated zinc sulphate solution thus formed and precipitating zinc sulphate therefrom, and electrolyzing the cold zinc sulphate solution thus formed for the recovery of zinc therefrom, and adding last mentioned precipitated zinc sulphate to the solution during the later part of the electrolysis so as to keep up the zinc concentration in said solution and returning the spent electrolyte from said electrolysis for the dissolving of more zinc sulphate from more sulphated ore, as described above.

10. The process of treating zinc sulphide ores and concentrates and the like which consists in grinding said material in hot sulphuric acid in the range of concentration in which the solubility of zinc sulphate in the hot acid is near the minimum and in amount much less than that required to dissolve the zinc sulphate formed in said hot acid treatment, thereby sulphating the zinc sulphide and forming zinc sulphate in solid form, and thereafter removing the excess of acid from admixture with the said solid zinc sulphate and the ore residue and returning said acid in the treatment of more of said initial material, and dissolving zinc sulphate out of said mixture of zinc sulphate and ore residue with spent electrolyte from an electrolytic circuit to form a zinc solution and thereafter washing the residual acid and zinc sulphate away from said ore residue with water to form another zinc solution and mixing said solutions to form an acid solution of zinc sulphate, concentrating the acid zinc sulphate solution thus formed to an acid concentration sufficient to precipitate the greater portion of the zinc sulphate therefrom, and removing the precipitated zinc sulphate from the excess of acid and returning said acid to the treatment of more of said initial material, and dissolving said precipitated zinc sulphate and acid retained with it in water to form an acid zinc sulphate solution and neutralizing said retained acid by treatment with oxidized zinc ore to form a hot concentrated zinc sulphate solution and precipitating impurities therefrom by means of said oxidized zinc ore material and an oxidizing agent, and precipitating metals below zinc in the electromotive series from said solution by treatment with metallic zinc, and cooling the pure hot concentrated zinc sulphate solution thus formed and precipitating zinc sulphate therefrom, and electrolyzing the cold zinc sulphate solution thus formed for the recovery of zinc therefrom, and adding last mentioned precipitated zinc sulphate to the solution during the later part of the electrolysis so as to keep up the zinc concentration in said solution and returning the spent electrolyte from said electrolysis for the dissolving of more zinc sulphate from more sulphated ore as described above.

11. The process of treating zinc sulphide ores and concentrates and the like which consists in grinding said initial material in relatively concentrated sulphuric acid in amount much less than that required to dissolve the zinc sulphate formed in above said treatment, thereby sulphating the zinc sulphide and forming zinc sulphate in solid form, and thereafter filtering the excess of acid out of its mixture with the said solid zinc sulphate and the ore residue and returning said acid in the treatment of more of said initial material, and dissolving zinc sulphate out of said mixture of zinc sulphate and ore residue with spent electrolyte from an electrolytic circuit and thereafter washing the residual acid and zinc sulphate away from said ore residue with water and mixing said solutions and concentrating the acid zinc sulphate solution thus formed to form acid of a concentration sufficient to precipitate the greater portion of the zinc sulphate therefrom, and filtering the precipitated zinc sulphate from the excess of acid and heating said zinc sulphate and driving off the retained acid, and dissolving said dried zinc sulphate in water, and precipitating impurities from the zinc sulphate solution thus formed by means of an oxidizing agent and an oxidized zinc compound, and precipitating metals lower than zinc in the electromotive series from said solution with metallic zinc, and electrolyzing said solution for the recovery of zinc therefrom, and using the spent electrolyte from said electrolysis for the dissolving of more zinc sulphate from more sulphated ore as described above.

12. The process of treating zinc sulphide ores and concentrates and the like which consists in grinding the said initial material in sulphuric acid in the range of concentration in which the solubility of zinc sulphate in the hot acid is near the minimum and in amount much less than that required to dissolve the zinc sulphate formed in above said treatment, thereby sulphating the zinc sulphide and forming zinc sulphate in solid form, and thereafter filtering the excess of acid out of its mixture with the said solid zinc sulphate and the ore residue and returning said acid for the treatment of more of said initial material, and dissolving zinc sulphate out of said mixture of zinc sulphate and ore residue with spent electrolyte from an electrolytic circuit and thereafter washing the residual acid and zinc sulphate away from said ore residue with water and mixing said solution and concentrating the acid zinc sulphate solution thus formed to form acid of a concentration sufficient to precipitate the greater portion of the zinc sulphate therefrom, and filtering the precipitated zinc sulphate from the excess of acid and heating said zinc sulphate and driving off the retained acid, and dissolving said dried zinc sulphate in water, and precipitating impurities from the zinc sulphate solution thus formed by means of an oxidizing agent and an oxidized zinc compound, and precipitating metals lower than zinc in the electromotive series from said solution with metallic zinc, and electrolyzing said solution for the recovery of zinc therefrom, and returning the spent electrolyte from said electrolysis for the dissolving of more zinc sulphate from more sulphated ore while grinding the same.

13. The process of treating zinc sulphide ores and concentrates and the like which consists in grinding the said initial material in hot relatively concentrated sulphuric acid, in amount much less than that required to dissolve the zinc sulphate formed in above said treatment, thereby sulphating the zinc sulphide and forming zinc sulphate in solid form, and thereafter separating the excess of acid from mixture with the said solid zinc sulphate and the ore residue and returning said acid for the treatment of more ore, and dissolving zinc sulphate out of said mixture of zinc sulphate and ore residue with spent electrolyte from an electrolytic circuit and thereafter washing the residual acid and zinc sulphate away from said ore residue with water, and mixing said solutions and concentrating the acid zinc sulphate solution thus formed to form acid of a concentration sufficient to precipitate the greater portion of the zinc sulphate therefrom, and separating the precipitated zinc sulphate from the excess of acid and heating said zinc sulphate and driving off the retained acid, and dissolving said dried zinc sulphate in water, to form a hot concentrated zinc sulphate solution and precipitating impurities therefrom by treatment with an oxidizing agent and an oxidized zinc compound, and precipitating metals lower than zinc in the electromotive series from said solution with metallic zinc, and cooling the pure hot concentrated zinc sulphate solution thus formed and precipitating zinc sulphate therefrom, and electrolyzing the cold zinc sulphate solution thus formed for the recovery of zinc therefrom, and adding last said precipitated zinc sulphate to the solution during the later part of the electrolysis so as to keep up the zinc concentration of the electrolyte, and returning the spent electrolyte for the treatment of more of the sulphated initial material.

14. The process of treating zinc sulphide ores and concentrates and the like which consists in grinding said initial material in hot sulphuric acid in the range of concentration in which the solubility of zinc sulphate in the hot acid is near the minimum and in amount much less than that required to dissolve the zinc sulphate formed in above said treatment, thereby sulphating the zinc sulphide and forming zinc sulphate in solid form, and thereafter separating excess acid from its mixture with the said solid zinc sulphate and the ore residue and returning said acid in the treatment of more ore, and dissolving zinc sulphate out of said mixture of zinc sulphate and ore residue with spent electrolyte from an electrolytic circuit and thereafter washing the residual acid and zinc sulphate away from said ore residue with water, and mixing said solutions and concentrating the acid zinc sulphate solution thus formed to form acid of a concentration sufficient to precipitate the greater portion of the zinc sulphate therefrom, and separating the precipitated zinc sulphate from the excess acid and heating said zinc sulphate and driving off the retained acid, and dissolving said dried zinc sulphate in water, to form a hot concentrated zinc sulphate solution and precipitating impurities therefrom by means of an oxidizing agent and an oxidized zinc compound, and precipitating metals lower than zinc in the electromotive series from said solution with metallic zinc, and cooling the pure hot concentrated zinc sulphate solution thus formed and precipitating zinc sulphate therefrom, and electrolyzing the cold zinc sulphate solution thus formed for the recovery of zinc therefrom, and adding last said precipitated zinc sulphate to the solution during the later part of the electrolysis so as to keep the zinc concentration of the electrolyte, and returning the spent electrolyte for the treatment of more sulphated ore as described above.

15. The process of treating zinc sulphide ores and concentrates and the like which comprises grinding such initial material in hot sulphuric acid of about 50 to 70% concentration, in amount at least sufficient to react with all ZnS present, but the said amount of acid present being only a very minor fraction of that quantity which would be required to dissolve all the zinc sulphate formed in said treatment, thereby directly sulphating the zinc sulphide and directly forming zinc sulphate in solid form, and thereafter separating the excess of acid out of its mixture with the said solid zinc sulphate and the ore residue, such separated acid containing in solution not more than a very small fraction of the zinc sulphate formed in said sulphating operation, and treating more of such initial material with said acid while hot and while grinding the material, and thereafter, after separating said excess acid, dissolving said zinc sulphate out of said mixture of zinc sulphate and ore residue, by treatment of the sulphated material with an aqueous liquid, and neutralizing and purifying the solution containing $ZnSO_4$ by treatment with an oxidized zinc compound and an oxidizing agent whereby a purified $ZnSO_4$ solution is produced.

16. The process of treating zinc sulphide ores, concentrates, and the like, which comprises grinding said initial material with hot relatively concentrated sulphuric acid in an amount which is only a small fraction of that amount which would be required to dissolve all of the zinc sulphate formed by said treatment, and thereby decomposing zinc sulphide in said initial material and forming zinc sulphate therefrom in solid form, and thereafter separating excess acid out of its mixture with said solid zinc sulphate and ore residue, and returning said acid for the treatment of more of the initial material as described, and dissolving said solid zinc sulphate and residual acid in water to form an acid zinc sulphate solution and separating the aqueous solution of zinc sulphate from said ore residue.

17. Process as in claim 16, in which the acid initial zinc sulphate solution, is treated with an oxidized zinc compound and an oxidizing agent to neutralize and purify said solution, and this is treated with metallic zinc to precipitate metals below zinc in the electromotive series and thereafter calcium chloride is added to the purified zinc sulphate solution, precipitating calcium sulphate and treating the zinc chloride solution with $H_2S$ and a basic calcium compound to precipitate ZnS.

18. Process as in claim 15, in which the initial zinc sulphate solution is purified and then treated with calcium chloride, the precipitated $CaSO_4$ removed and calcium sulphhydrate added to the $ZnCl_2$ solution, to precipitate ZnS.

19. In the treatment of finely divided ores and concentrates containing zinc and lead sulphides, with sulphuric acid to convert the zinc sulphide therein into solid zinc sulphate, the process which consists in grinding said ore material in admixture with hot sulphuric acid in the range of concentration in which the solubility of the zinc sulphate in the hot acid is near the minimum, such sulphuric acid being in an amount substantially in excess over that stoichiometrically equivalent to the zinc in the ore material, but only a minor fraction of that amount which would be necessary to dissolve all of the zinc sulphate produced from the zinc sulphide, and thereby converting zinc sulphide in said material directly into zinc sulphate, substantially all in solid form, and separating the excess of said sulphuric acid containing only a very minor fraction of the total zinc sulphate in solution, from the treated ore material, while the latter contains in an undissolved state, the main bulk of the zinc sulphate produced in such operation, for reuse of said acid in treating more of the said zinc ore material, the main bulk of the zinc sulphate present at any one time being in the solid state.

20. The process of treating zinc sulphide ores and concentrates which consists in grinding said ores and the like with such an excess of hot sulphuric acid of such concentration that the zinc in said ores is converted to zinc sulphate of which by far the greater part is continuously maintained in the solid state and the sulphur is driven off as $H_2S$.

21. The process of treating zinc sulphide ores and concentrates which consists in grinding said ores and the like with an excess of hot sulphuric acid of a concentration about 50% to 75% $H_2SO_4$ at a temperature near the boiling point of said acid, and thereby decomposing the zinc sulphide in said ores and forming zinc sulphate of which by far the greater part is continuously maintained in the solid state and driving off the sulphur as $H_2S$.

22. The process of treating zinc sulphide ores and concentrates which consists in grinding said ores and the like with an excess of hot sulphuric acid of a concentration between 60% and 70% $H_2SO_4$ at a temperature near the boiling point of said acid and thereby decomposing the zinc sulphide and forming zinc sulphate of which by far the greater part is continuously maintained in the solid state and driving off the sulphur as $H_2S$.

23. The herein described process of treating native zinc sulphide, which comprises heating the same with sulphuric acid of about 50% to about 70% strength, while subjecting the mass to attrition, and prolonging such treatment until the major part at least of said zinc sulphide has been decomposed with formation of zinc sulphate, the amount of the sulphuric acid used being insufficient to dissolve more than a very minor fraction of the total zinc sulphate formed.

NIELS C. CHRISTENSEN.